United States Patent [19]

Taboada

[11] Patent Number: 4,951,993
[45] Date of Patent: Aug. 28, 1990

[54] ACCORDION PLEATED VEHICLE COVER

[76] Inventor: Vincent C. Taboada, 22 Ararat Ct., Sacramento, Calif. 95831

[21] Appl. No.: 461,224

[22] Filed: Jan. 5, 1990

[51] Int. Cl.$^5$ ............................................. B60J 11/00
[52] U.S. Cl. .................................. 296/136; 160/370.2; 150/166
[58] Field of Search ................. 296/136, 97.8, 95.1; 160/84.1, 370.2; 150/166, 168

[56] References Cited

U.S. PATENT DOCUMENTS

| | | | |
|---|---|---|---|
| D. 236,868 | 9/1975 | Levy | D6/332 |
| 2,279,812 | 4/1942 | Bartlett | 150/166 |
| 2,620,007 | 0/1952 | Keller | 150/166 |
| 3,146,784 | 9/1964 | Silver | 296/136 X |
| 3,992,053 | 11/1976 | Hrytzak et al. | 135/88 |
| 4,164,233 | 8/1979 | McAndrew | 135/88 |
| 4,184,501 | 1/1980 | Johnson | 135/88 |
| 4,202,396 | 5/1980 | Levy | 160/107 |
| 4,519,644 | 5/1985 | Song | 296/136 |
| 4,684,165 | 8/1987 | Becker | 296/136 |

FOREIGN PATENT DOCUMENTS

| | | | |
|---|---|---|---|
| 74422 | 7/1952 | Denmark | 296/136 |
| 2252745 | 6/1975 | France | 296/95.1 |
| 2524398 | 10/1983 | France | 296/136 |
| 60422 | 3/1989 | Japan | 296/136 |
| 2167719 | 6/1986 | United Kingdom | 150/166 |

Primary Examiner—Margaret A. Focarino
Assistant Examiner—Andrew C. Pike
Attorney, Agent, or Firm—James M. Ritchey

[57] ABSTRACT

A reversibly expandable vehicle cover is a generally rectangular cover body which is folded along transverse folding scores into an accordion pleated hinged series of panels terminating in front and end panels. Extending slidably through receiving openings in the panels and extending beyond the front and rear end panels are adjustable length elastomeric guide cords that fasten at the front and rear ends of the cover body with end panel cords that are themselves fastened by one end to the front and rear end panels of the cover body. Upon extending the cover over the vehicle, the cover is secured to the front and rear ends of the vehicle by couplers associated with the termini of the cords.

13 Claims, 5 Drawing Sheets

ACCORDION PLEATED VEHICLE COVER

BACKGROUND OF THE INVENTION

1. Field of the Invention

The subject invention relates to protective covers for vehicles. More particularly, it refers to a semirigid, yet collapsible and easily storable vehicle cover that is a sun and waterproof barrier deployed and retracted by means of expanding and contracting its accordian-like pleated construction.

2. Description of the Background Art

Traditionally, vehicle covers have suffered from various practical limitations such as excessive complexity, prodigious weight, flimsy construction, inordinate expense, non-functionality, storage problems, cleaning obstacles, cover induced damage to the surface of the vehicle, and similar difficulties that have diminished the general acceptance of such covers. The subject invention has overcome these and other similar problems of the prior art.

Various attempts have been made over the past years to produce a cover device that is convenient and practical. Specifically, U.S. Pat. No. 2,620,007 discloses a vehicle cover constructed from flexible material contoured to enclose the vehicle on all sides except the bottom. Straps are attached to the cover to aid in mounting the device over the vehicle. This cover is very similar in design to a pillowcase. Anchors are provided for securing the device to the vehicle.

Related to U.S. Pat. No. 3,992,053 is a sun shield for automobiles that consists of a strip of screening material which is stored on a roller within a cylindrical container attached to the automobile. Leg supports are provided to prevent the screening material from contacting the bodywork. The roof lef supports are foldably attached to the roof gutters.

A vehicle covering apparatus is presented in U.S. Pat. No. 4,164,233. This device entails a pliable sheet of opaque, waterproof material that is stretched between two extension bars, one bar anchored by clamps at each end of the vehicle. The sheet covers only the top portion of the vehicle.

Disclosed in U.S. Pat. No. 4,184,501 is a solar shield for a vehicle. This solar shield comprises an adjustable frame that runs the length of the vehicle and is anchored by clamps at the front and rear of the vehicle. The main longitudinal support frame members are telescoping devices for easy extension and contraction. The cover material is a lightweight and totally flexible product. Since the frame holds the cover away from the vehicle, an air space exists between the vehicle's surface and the underside of the cover.

A motor vehicle sunshield is described in U.S. Pat. No. 4,202,396 (U.S. Design Pat. Des. 236,868). Unlike the other cited sun protection devices, this device is merely a foldable screen of substantially rigid sheet material. This screen is positioned inside a vehicle on a dashboard, thereby preventing sunlight from penetrating the windshield of the vehicle.

The French Patent 2524-398-A discloses a device for protecting a car from the sun comprising a flexible sheet which is deployed above the bodywork of the vehicle. Spacing elements produce a gap between the flexible sheet and the vehicle bodywork. The sheet is anchored at the front and rear of the vehicle by attachment means. Either a loop fits under the front end of the vehicle or gripping elements slip into a rear trunk opening at the back of the vehicle.

Related to U.S. Pat. No. 4,519,644 is a foldable vehicle cover that is storable of the vehicle. A plurality of C-frame members support a protective fabric that covers all sides of the car except the bottom. The construction of this device is relatively complex and consists of various interacting elements relating to support and folding functions.

A Great Britain Patent 2,167,719-A discloses a vehicle shade constructed of substantially opaque flexible material adapted to be longitudinally stretched over a vehicle and secured to the front and rear ends thereof by elastic cords. Spacers separate the cover from the roof to provide an insulating air gap.

Finally, the U.S. Pat. No. 4,684,165 presents another motor vehicle sun screen apparatus. A complete roof rack is included in this device for carrying the cover. The cover is a sheet of flexible material that protects the roof from sun damage and is deployed by removing the two end portions of the sheet from the rack and stretching the cover between front and rear clamped anchors.

SUMMARY OF THE INVENTION

An object of the present invention is to provide an easy to use, simple, practical, and convenient all-weather vehicle cover suitable for both fixed roof and open or closed convertible roof vehicles.

Another object of the present invention is to produce a vehicle cover that includes an inherent air-space between the cover and the vehicle surface to facilitate cooling during heating from the sun's radiation.

An additional object of the present invention is to furnish lengthwise vehicle protection to prevent front and rear windshield damage from airborne hazards such as pebbles, dirt, dust, and similar particles in windy areas.

A further object of the present invention is to effect a vehicle cover that folds by accordion-like pleats into a compact form that is easily stored in the trunk of the vehicle or other location.

Yet another object of the present invention is to create a readily washable vehicle cover made from a waterproof and rigid or semi-rigid material that resists deformation, reflects heating solar radiation, and can withstand moderate amounts of wind without being blown off the vehicle.

The subject invention, a vehicle cover, comprises a generally rectangular cover body folded along transverse folding scores into an accordion pleated hinged series of panels terminating in front and end panels. Extending slidably through receiving openings in the panels and extending beyond the front and rear end panels are adjustable length elastomeric guide cords that fasten at the front and rear ends of the cover body with end panel cords that are themselves fastened by one end to the front and rear end panels of the cover body. Upon extending the cover over the vehicle, the cover is secured to the front and rear ends of the vehicle by couplers associated with the termini of the cords.

Other objects, advantages, and novel features of the present invention will become apparent from the detailed description that follows, when considered in conjunction with the associated drawings.

DESCRIPTION OF THE PREFERRED EMBODIMENT

Figure 1:
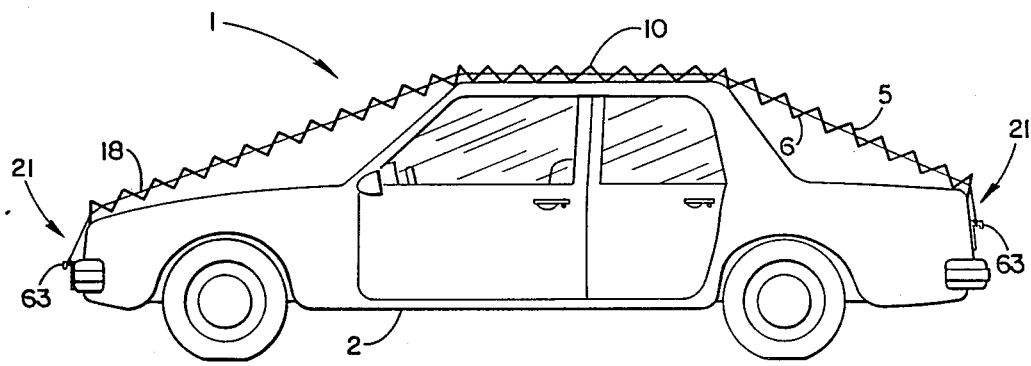
FIG. 1 is a perspective view of the subject device covering a typical vehicle.
Figure 3:
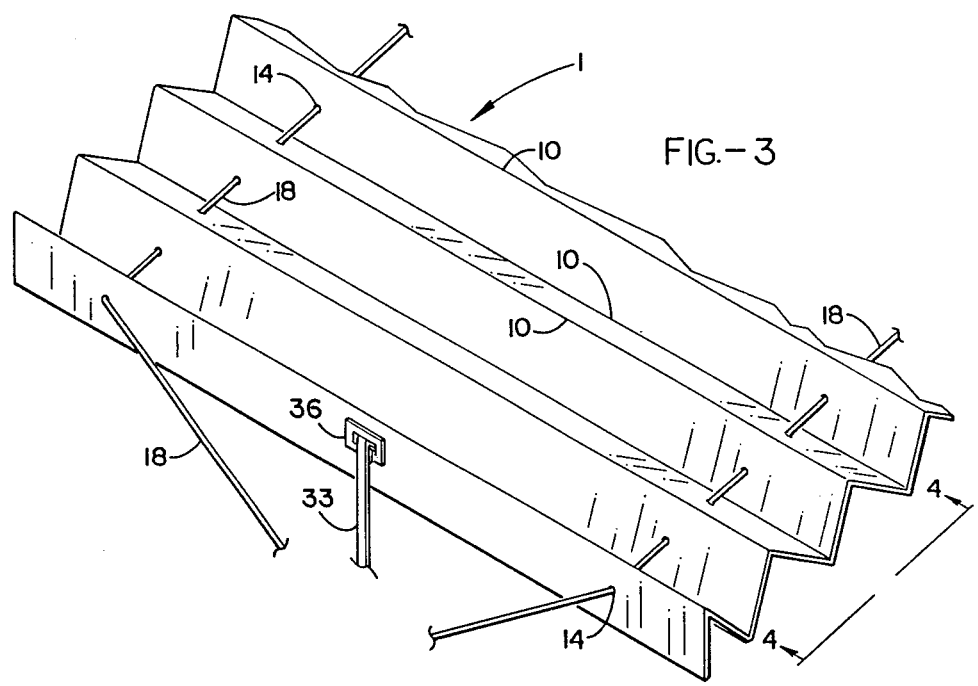
FIG. 3 is an overhead view of the pleated cover body.

Referring now to FIGS. 1-8, there is shown an accordion pleated vehicle cover 1 of the subject invention. This device is for protecting the passenger compartment of a vehicle 2 from excessive heat buildup caused by solar radiation and for preventing damage to the surface of a vehicle from conditions such as solar radiation, hail, wind driven particulate matter, and similar considerations.

The subject invention, as illustrated in particular in FIGS. 1-4, comprises a generally rectangular vehicle cover body 3 having upper 5 and lower 6 surfaces, two opposing long side borders 7, and front end 8 and rear end 9 short borders. The body 3 is fabricated from lightweight substances such as plastics, paper matter treated to resist weather damage, and equivalent materials. The thickness of the body 3 is usually between about one-eight and one-half inch, more commonly between about one-eight and five-sixteenth inch, and preferably between about one-eight and one-quarter inch. As would be desirable for advertising or informational purposes, messages, art work, and other like displays may be associated with, preferably, the upper 5 surface of the cover body 3.

At a plurality of locations, transverse folding scores 10 are introduced into the body thereby generating a plurality of hinged panels. The hinged folds or folding scores 10 are to permit a user to easily fold a cover body 3 along these scores 10 to generate a reversibly expandable accordion pleated structure. The folding scores are produced by standard techniques, including, but not limited to, pressing, stamping, heating, rolling, and initial molding. An accordion pleated configuration is created by bending alternating scores 10 in opposite directions.

Figure 2:
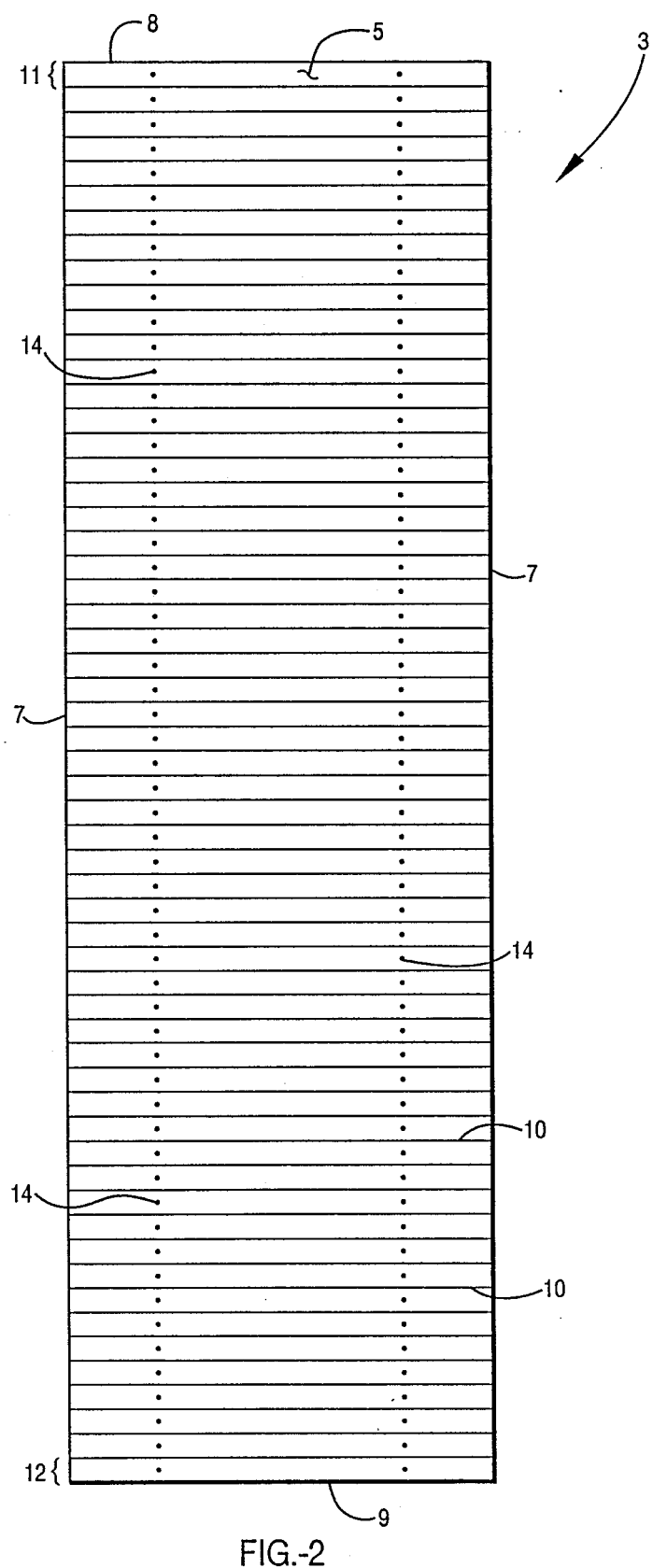
FIG. 2 is an overhead view of the cover body.

The plurality of panels generated by the scored folds 10 terminates in front end 11 and rear end 12 panels defined by one score fold 10, portions of each long side border 7, and either the front end short border or rear end short border, respectively (in particular, see, FIG. 2). Between the front end 11 and rear end 12 panels are interior panels each having edges defined by two scores 10 and portions of each long side border 7. The actual number of interior panels is variable and would fluctuate with the size of the vehicle to be covered. Preferably the score folds 10 would be spaced at regular intervals, but irregular spacings are well within the realm of this specification and claims.

Proximate the long side borders 7 of each panel is a guide cord receiving opening 14 for slidably receiving a guide cord 18. Although each panel may have a large plurality of such openings 14, the preferred number is two, wherein each is located between the longitudinal body 3 midline and each long side border 7. When the accordion pleated body 3 is folded into a compacted form, the series of openings 14, along each long side border 7, would approximately align over one another.

A guide cord 18 is one component of a guide cord member, wherein the guide cord member comprises the guide cord 18 and two terminating guide cord couplers. Since the preferred number of openings, in any one panel, is two, preferably two guide cords 18 are used for a cover body 3. A guide cord 18 slidably penetrates the series of openings 14 and extends beyond the front end 11 and rear end 12 panels to terminate in front end and rear end couplers. Even though a guide cord 18 may be fabricated from various materials such as natural and synthetic polymers and fibers, the preferred substance is an elastomeric polymer that permits extensive elongation and contraction so that a guide cord 18 is reversibly expandable to span the length of a vehicle the cover body 3 is to protect. The cross-sectional area of a guide cord 18 may be any shape such as round, rectangular, oblong, and the like.

To connect the cover body 3 to a vehicle, a vehicle attachment system 21 is employed. This system comprises a plurality of components, associated with the guide cords 18, that serve to anchor the cover body 3 to various vehicle types at front end and rear end vehicle attachment points such as standard towing fittings, bumpers, vehicle frame support members, specifically designed vehicle attachment pieces (see below for details), and equivalent members.

Figure 4:
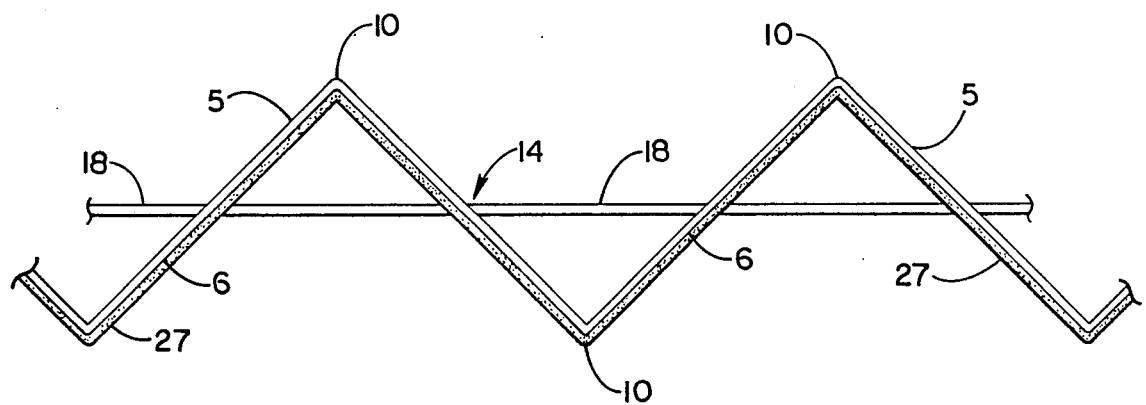
FIG. 4 is a side view of the pleated cover body.

Shown in FIG. 4 is a further embodiment of the subject device having a layer of protective padding material 27. Even though the cover body 3 is constructed of lightweight materials, careless deployment and strong wind induced movements may damage a vehicle's polished surface. To eliminate this possible problem, a thin protective material is adhered to the lower surface 6 of the body 3. This padding is of any appropriate substance including, but not limited to, natural and synthetic polymers, preferably a foam rubber type material that bends easily so as not to interfere with folding the cover body 3 into a compacted form. The padding 27 is attached to the lower surface 6 by standard gluing procedures or equivalent methods.

Figure 5:
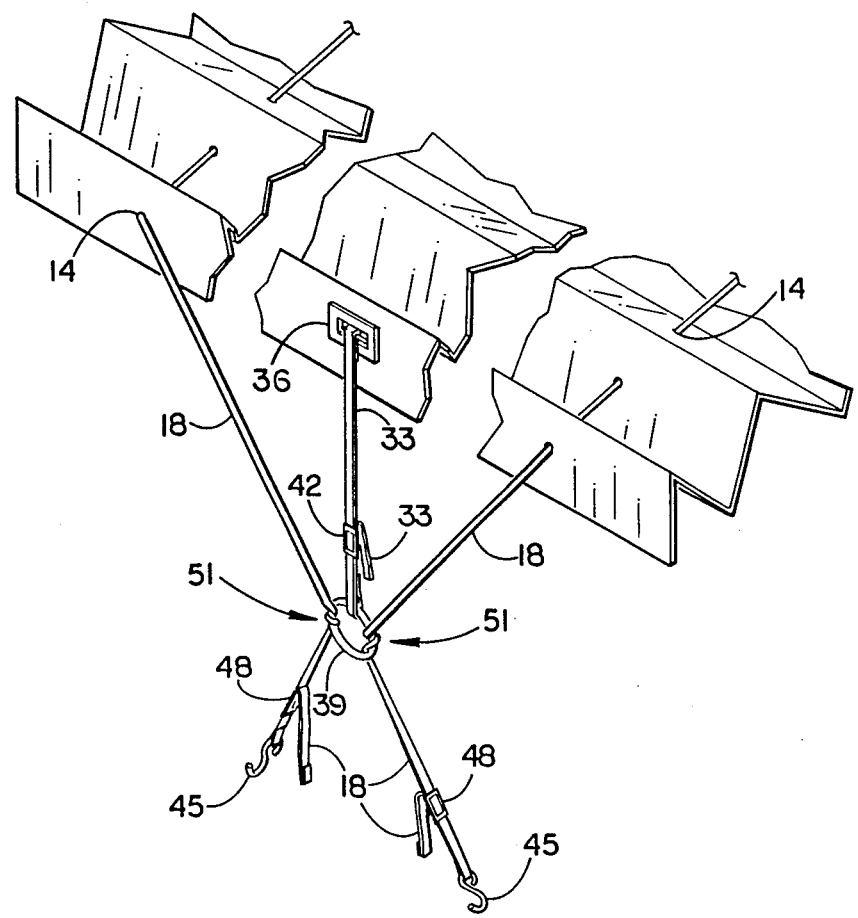
FIG. 5 is a perspective view of the vehicle attachment system for coupling the subject invention cover to a vehicle.

Since the guide cords 18 slidably penetrate the panel receiving openings 14, when the cover body 3 is expanded to cover a vehicle, the body 3 does not necessarily follow the expanding cords 18 into an open protective configuration. To produce an automatic deployment of the cover body 3 with the expansion of the guide cords 18, an end panel cord member is included in the vehicle attachment system 21. Both the front end 11 and rear end 12 panels have such an end panel cord member mounted to them. As seen in FIG. 5, each end panel cord member comprises an end panel cord 33 with an end panel attachment terminus 36 at one end and at the other end an end panel cord coupler comprising a linking element 39 and means 42 for increasing or decreasing the end panel cord 33 length. The end panel attachment termini 36 are fastened to end panels (11 and 12). The method for fastening an end panel attachment terminus 36 to an end panel (11 and 12) includes gluing, stitching, heating, riveting, and similar like procedures. The end panel cords 33 are fabricated from natural or synthetic polymers and may be inelastic or elastic.

At the other end of the end panel cord 33 is the end panel cord coupler that serves a dual role. First, a linking element 39 is an attachment point for the guide cords 18 that extends beyond an end panel. Second, the end panel cord coupler is employed to adjust the length of the end panel cord 33 by suitable means 42 such as a slidable clamp, buckle, or like device. Concerning the linking element 39, it may be of any suitable construction to reversibly engage the guide cords 18, including the preferred ring structure or functionally equivalent configuration. FIG. 5 illustrates one method of fastening the guide cords 18 to a the linking element 39. Each guide cord 18 runs through the linking element 39 and on to a vehicle attachment point. When a guide cord 18 runs through the linking element 39, particularly when the linking element 39 is a continuous ring suitable for reversibly mating (where the ring is circular, square, or similarly shaped), a segment 51 of the guide cord 18 is wrapped once or more about the ring to aid in holding the end panel cord 33.

Preferably a guide cord terminus coupler comprises a guide cord coupler hook 45 and a guide cord detachable means 48 for decreasing and increasing the length of a guide cord 18. In practice the hook 45 may be replaced by any equivalent easily employed reversible fastening device. As with the end panel cord lengthening means 42, the guide cord means 48 is usually a slidable clamp, buckle, or like device. To permit the easy insertion of the guide cord 18 into the linking element 39, the guide cord coupler is preferably detachable from the guide cord 18.

Figure 6:
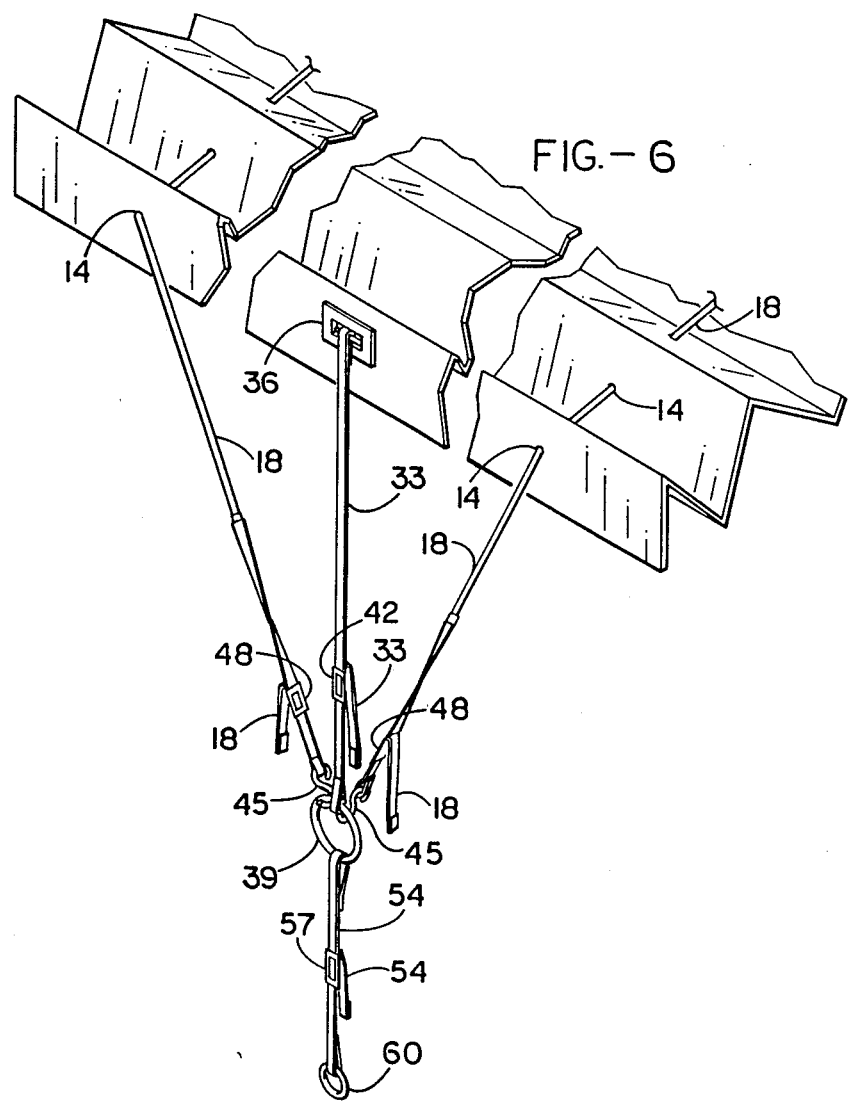
FIG. 6 is a perspective view of a further embodiment of the vehicle attachment system of the subject invention.

FIG. 6 depicts an alternate embodiment of the subject device. Instead of reversibly mating a segment 51 of a guide cord 18 to the linking element 39 and running the guide cord couplers to vehicle attachment points, the guide cord coupler hooks 45 are directly hooked around the linking element 39. To secure the cover body 3 to a vehicle, vehicle anchoring means are employed.

The vehicle anchoring means comprises a vehicle anchoring cord member having a length of anchoring cord 54 having two ends wherein one end is secured to the linking element 39 and the other end has both means 57 for decreasing and increasing the anchoring cord's 54 length and a vehicle anchor mating pair. The vehicle anchor mating pair comprises an anchor cord joining mate member 60 and a vehicle mate member 63 affixed to the vehicle. These two members (60 and 63) reversibly join to one another thereby securing the cover 1 to the vehicle. For ease of operation, the anchoring cord joining mate member 60 is preferably a ring like device (as above, the ring may be of any suitable configuration), but alternative configurations are well within the realm of this disclosure.

Figure 7:
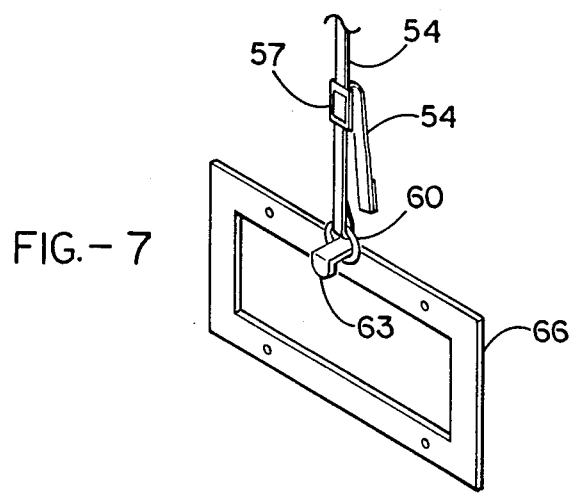
FIG. 7 is a perspective view of a vehicle anchor mating pair of the subject invention.
Figure 8:
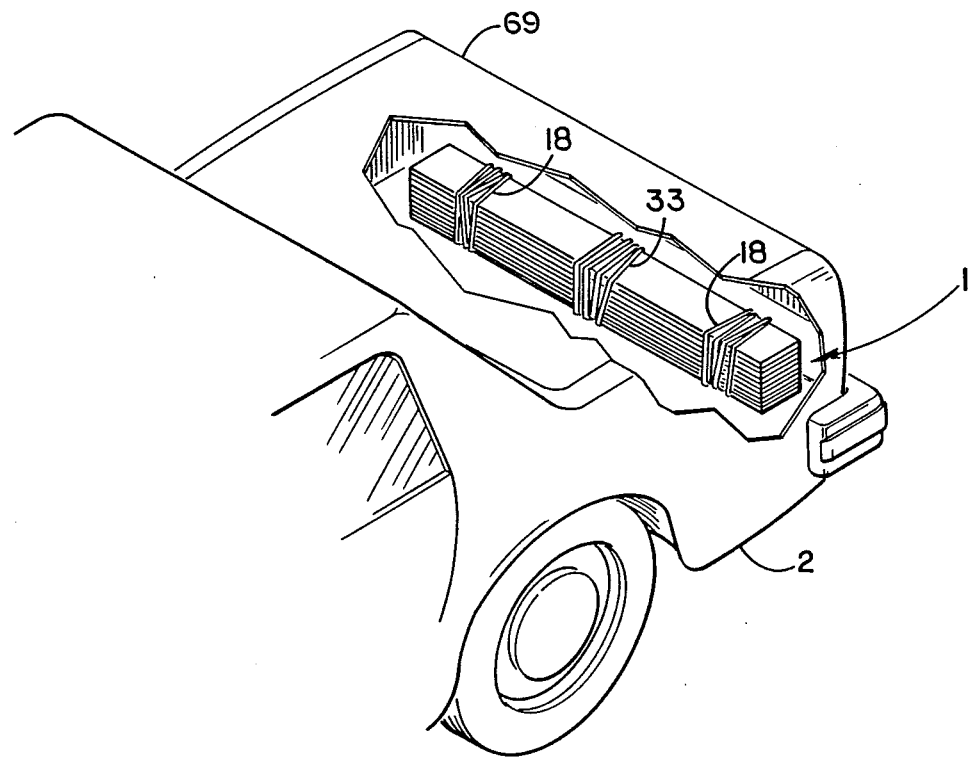
FIG. 8 is a perspective view of a folded vehicle cover stored in the trunk of a typical vehicle.

As seen in FIG. 7, the vehicle mate member 63 is preferably a hooking member either directly incorporated into a license plate mount 66 or in a form that would be secured near the license plate mount 66. The hook reversibly engages the joining ring to secure the cover 1 of the vehicle.

Normal usage of the subject device involves storing the cover 1 between deployments. Storage in a vehicle's trunk 69 is usually accomplished by compacting the cover 1 into a folded form (see, FIG. 8) and possible consolidated it into an easily handled package by wrapping the cords (18 and 33) about the body 3. Other storage locations and methods are at the option of a user.

Although sequence variation obviously exist in the exact steps used to spread the cover 1, a typical deployment route has the user initially securing either the guide cord coupler hooks 45 at one end of the device to vehicle attachment points or one anchor cord joining mate member 63 to a vehicle mate member 63 affixed to the vehicle. Next, the user pulls the expandable cover over the vehicle and hooks the other coupler hooks 45 or joining mate member 63 to the opposite end of the vehicle. Given the exact nature of the vehicle, a cover 1 combination that includes a set of coupler hooks 45 at one end and an anchor cord joining mate member 63 at the other is an option.

The invention has now been explained with reference to specific embodiments. Other embodiments will be suggested to those of ordinary skill in the appropriate art upon review of the present specification.

Although the foregoing invention has been described in more detail by way of illustration and example for purposes of clarity of understanding, it will be obvious that certain changes and modifications may be practiced within the scope of the appended claims.

What is claimed is:

1. A reversibly expandable cover for a vehicle, comprising:
   (a) a generally rectangular cover body having upper and lower surfaces, two opposing long side borders, front end and rear end short borders, and a plurality of transverse folding scores wherein each folding score serves as hinge thereby producing a plurality of panels hinged to each abutting panel at said folding scores and having alternating said hinges folding in opposite directions to produce an accordion pleated structure for said cover body wherein said plurality of panels terminates in a front end panel and a rear end panel each hinged to only one other panel at a folding score;
   (b) a plurality of guide cord members each comprising a length of elastomeric guide cord that slidably penetrates each of said panels through guide cord receiving openings in said panels and extends beyond said front end and rear end panels to terminate in front and rear end guide cord couplers with each of said elastomeric guide cords reversibly expandable to span a length of said vehicle; and
   (c) front end and rear end panel cord members each comprising a length of end panel cord with an end panel attachment terminus at one end and an end panel cord coupler at another end wherein said end panel attached terminus for said front end panel cord member is fastened to said front end panel and said end panel attachment terminus for said rear end panel cord member is fastened to said rear end panel.

2. A vehicle cover according to claim 1, wherein each end panel cord is fabricated from elastomeric materials.

3. A vehicle cover according to claim 1, wherein each of said front and rear end guide cord couplers comprises a hook and a cord detachable means for decreasing and increasing one guide cord's length between said front and rear end guide cord couplers.

4. A vehicle cover according to claim 1, wherein each of said end panel cord couplers comprises a linking element and means for decreasing and increasing one end panel cord's length between one end panel and one linking element.

5. A vehicle cover according to claim 4, wherein each linking element comprises a continuous ring suitable for reversibly mating with either said front or said rear guide cord members.

6. A reversibly expandable cover for a vehicle, comprising:
(a) a generally rectangular cover body having upper and lower surfaces, two opposing long side borders, front end and rear end short borders, and a plurality of transverse folding scores within each folding score serves as a hinge thereby producing a plurality of panels hinged to each abutting panel at said folding scores and having alternating said hinges folding in opposite directions to produce an accordion pleated structure for said cover body wherein said plurality of panels terminates in a front end panel and a rear end panel each hinged to only one other panel at a folding score;
(b) a plurality of guide cord members each comprising a length of elastomeric guide cord that slidably penetrates each of said panels through guide cord receiving openings in said panels and extends beyond said front end and rear end panels to terminate in front and rear and guide cord couplers with each of said elastomeric guide cords reversibly expandable to span a length of said vehicle wherein each of said front and rear end guide cord couplers comprises a hook and a cord detachable means for decreasing and increasing said guide cord's length between said front and rear end guide cord couplers; and
(c) front end and rear end panel cord members each comprising a length of end panel cord with an end panel attachment terminus at one end attached to one end panel and an end panel cord coupler at another end wherein each end panel cord coupler comprises a linking element and means for decreasing and increasing one end panel cord's length between one end panel and one linking element with each linking element comprising a continuous ring suitable for reversibly mating with either said front or said rear guide cord members.

7. A vehicle cover according to claim 6, wherein said reversible mating comprises wrapping a segment of each of either said front or said rear guide cords that extends beyond either said front or said rear end panels around one ring and attaching said front end guide cord couplers to front end attachment points of said vehicle and said rear end guide cord couplers to rear end attachment points of said vehicle.

8. A vehicle cover according to claim 6, wherein each reversible mating comprises fastening one guide cord hook to one linking element ring.

9. A vehicle cover according to claim 8, further comprising vehicle anchoring means having a vehicle anchoring cord member comprising a length of anchoring cord having two ends wherein one end is secured to one linking element ring with the other end having both means for decreasing and increasing said anchoring cord's length and an anchoring cord joining mate member that is one half of a vehicle anchor mating pair for reversibly joining said cover to said vehicle wherein the other half of said mating pair is a vehicle mate member affixed to said vehicle.

10. A vehicle cover according to claim 9, wherein each cord joining mate member comprises a joining ring and said vehicle mate member is a hooking protrusion that reversibly engages said joining ring.

11. A vehicle cover according to claim 9, wherein said vehicle mate member is affixed proximate said vehicle's license plate mount.

12. A vehicle cover according to claims 1 or 6, further comprising a protective layer of padding material adhered to said lower body surface.

13. A vehicle cover according to claim 12, wherein said padding material is foam rubber.

* * * * *